United States Patent [19]

Alvarez

[11] 4,169,223
[45] Sep. 25, 1979

[54] BATTERY CELL SOLDERING APPARATUS

[76] Inventor: Oscar E. Alvarez, Apt. 701 East, 5700 Mariner South,, Tampa, Fla. 33609

[21] Appl. No.: 889,740

[22] Filed: Mar. 24, 1978

[51] Int. Cl.² .............................................. B23K 3/04
[52] U.S. Cl. ............................. 219/85 G; 219/85 D; 29/623.1; 29/623.2; 29/730; 29/731
[58] Field of Search ............... 219/85 D, 85 G, 85 M; 29/730, 731, 623.1, 623.2

[56] References Cited

U.S. PATENT DOCUMENTS

| | | | |
|---|---|---|---|
| 2,462,148 | 2/1949 | Ward | 219/85 D X |
| 3,562,481 | 4/1969 | West | 219/85 D |
| 3,644,980 | 2/1972 | Callss | 219/85 D |
| 3,734,167 | 5/1973 | Odman | 29/730 X |
| 3,791,018 | 2/1974 | Johnston | 219/85 D |
| 3,813,024 | 5/1974 | Kirschberger | 29/730 X |
| 3,912,544 | 10/1975 | Sabatino | 29/623.2 |
| 3,915,751 | 10/1975 | Sanekata | 29/623.2 X |

OTHER PUBLICATIONS

Sarnacki, F. H., Solder Thump, IBM Technical Disclosure Bulletin, vol. 18, No. 10, pp. 3182 & 3183, relied on.

*Primary Examiner*—Richard R. Kucia
*Attorney, Agent, or Firm*—Arthur W. Fisher, III

[57] ABSTRACT

A battery cell soldering apparatus for coupling a plurality of battery cells within a battery casing comprising a support platform and a battery casing holder wherein the support platform operatively supports a soldering block including a plurality soldering elements coupled to an electrical source together with a cooling means and control panel to selectively control the heating and cooling of the soldering block when the battery cells within the battery casing are held inverted in operative engagement with the plurality of soldering elements by the battery casing holder.

13 Claims, 7 Drawing Figures

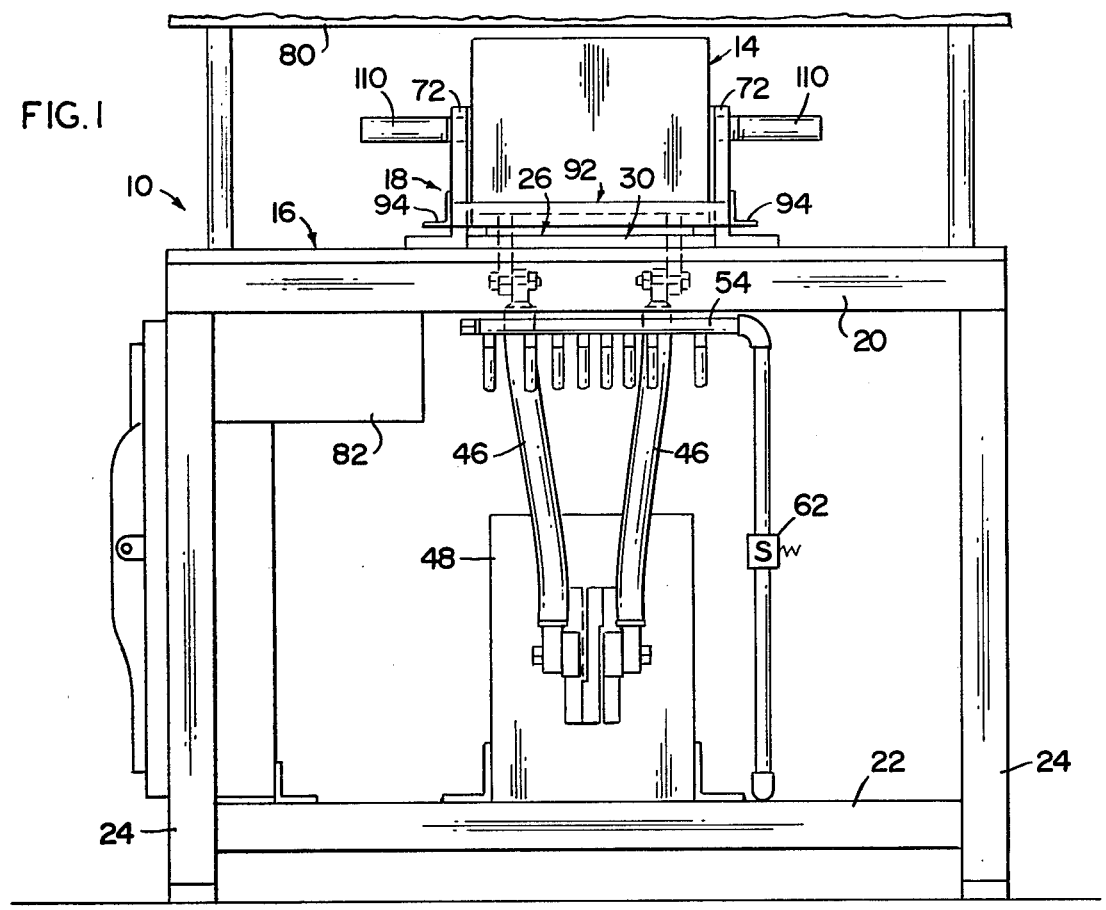
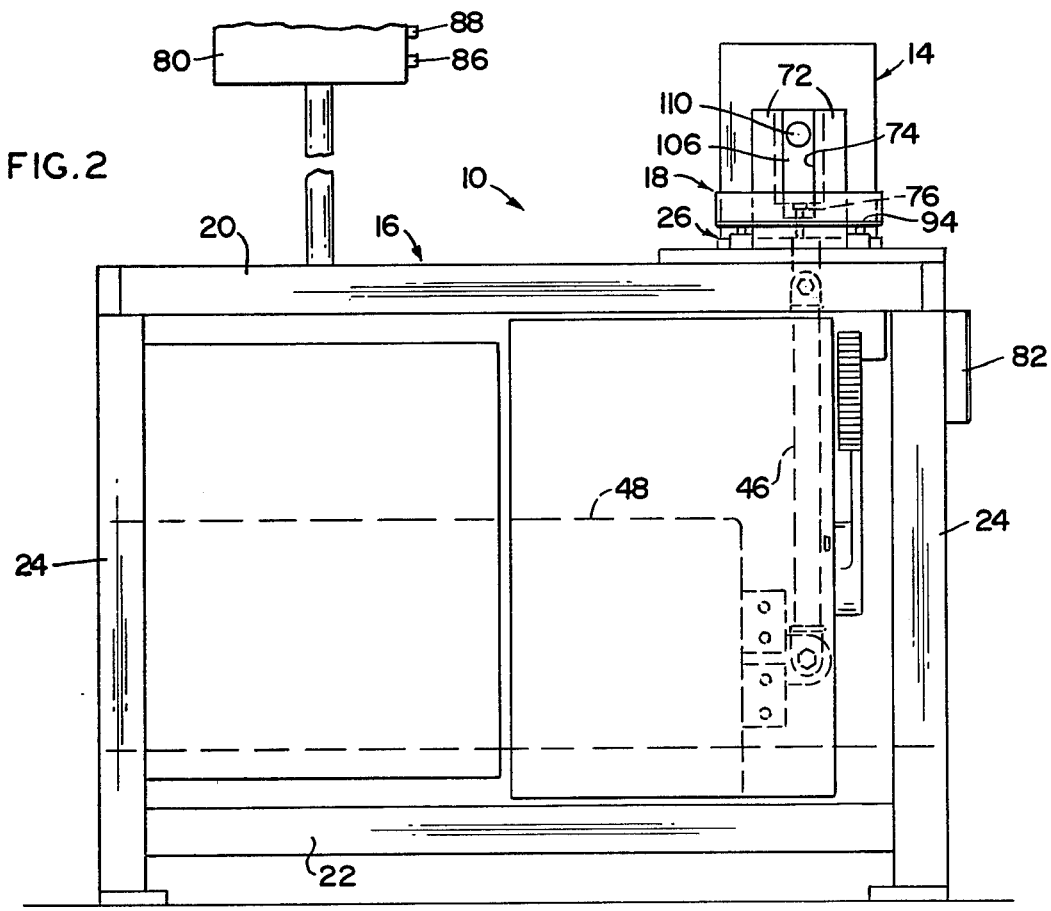

BATTERY CELL SOLDERING APPARATUS

BACKGROUND OF THE INVENTION

1. Field of the Invention

A battery cell soldering apparatus for coupling a plurality of battery cells within a battery casing comprising a support platform and a battery casing holder.

2. Description of the Prior Art

Lead storage batteries generally consist of a series of cells connected in series to provide the desired output of voltage. Each cell consists of a plurality of positive and negative plates carried in electrolyte, with the positive plates being connected together by a battery strap at one side of the top of the plates and the ngative plates being similarly connected together at the other side by another battery strap so as to provide parallel connections between the plates in each cell. In order to provide the desired series connection between cells, the plate units are lined up so that alternative positive and negative battery straps will appear on each side at the top of the plate units. In turn each battery strap has a post projecting from the top of the battery casing for connection with an externally located strap.

In the manufacture of lead storage batteries, "burning" means the melting or liquefying battery elements made of lead or an alloy thereof. Normally the battery elements are placed in a jig so that the molten lead runs into a pool and resolidities to create the desired connection between the elements. In addition, it may be necessary to add additional molten lead during the burning operation by exposing a bar of lead to the open flame at the same time.

Later developments provided for placing the strap internally just under the top of the battery casing. This provided for a saving in lead and a completely internal structure. Connection through the battery partitions provides a shorter current path, lower resistance and less lead. Due to the difficulties involved, considerable effort has been expended in providing the connections to the positive and negative battery straps directly through a partition in an efficient and reliable manner. For example, it is important to provide a positive seal between cell units so that electrolyte cannot pass from one cell to another.

It has been proposed to provide an aperture in each cell partition just above the battery straps to be connected and to provide a connector there through which in turn will be connected to each battery strap. Moreover, it is desirable to provide an apparatus which is capable of accomplishing good fusion of the lead in the aperture and making a completely sealed connection. Typically, such an apparatus consists of electrodes which are placed over the lugs and provided with a sufficient electric energy source to provide the burning or welding necessary. However, the cell spaces are rather small, and in a six cell battery five connectors must be welded. Accordingly, processing has been somewhat tedious and expensive and a need has arisen for a reliable machine capable of providing the connection in an automatic and reliable manner.

Examples for prior art efforts are found in U.S. Pat. Nos. 1,430,728; 2,430,188; 2,539,318; 2,626,038; 2,628,992; 2,664,842; 3,138,860; 3,210,833; 3,309,011; 3,544,754; 3,547,183; 3,597,825; 3,668,761; 3,674,085; 3,734,167; 3,744,112; 3,816,989; 3,908,739; 3,908,743; 3,978,571; 4,013,864. Unfortunately, the rejection rate of assembled batteries due to damage to the elements because of handling or damage to the battery case during the burning operations, has always been high. As a result the price of the lead storage battery must be such as to recover the losses in labor and materials which are the consequence of the rejection rate.

SUMMARY OF THE INVENTION

The present invention relates to a battery cell soldering apparatus for coupling a plurality of battery cells within a battery casing. More specifically, the battery cell soldering apparatus comprises a support platform and a battery casing holder.

The support platform comprises an upper and lower platform element held in fixed spaced relationship by a plurality of upright supports. The upper platform element operatively supports a soldering block.

The soldering block comprises a plurality of soldering elements held in fixed spaced relation relative to each other by a plurality of electrically conductive holding elements. Each soldering element comprises a carbon member having a substantially annular cavity formed on the upper portion thereof to receive the connection straps of the battery.

The outer most holding elements are coupled to an electrical source. In turn each holding element is electrically coupled in series to the next adjacent holding element. The soldering block further includes a cooling means coupled to a water or fluid source to selectively cool the soldering block. The entire soldering block is secured to the upper platform by an insulating frame. The insulating frame includes a horizontal adjustment means comprising a pair of adjustment elements disposed at opposite ends of the soldering block.

A vertical guide means is secured to the upper platform. The vertical guide means comprises a pair of vertical guides supports disposed at opposite ends of the soldering block. Each of the vertical guide includes a central disposed guide channel having a vertical adjustment means formed on the lower portion thereof to control the vertical separation of the battery casing holder relative to the soldering block as more fully described hereinafter. The battery cell soldering apparatus further includes a control means comprising a control panel, timer and fluid control means.

The battery casing holder comprises a rectangular frame including end frame members and side frame members. Each side frame member comprises outer element and base element extending inwardly therefrom at a substantially right angle thereto. A plurality of spaced apart battery cell engagement members extend upwardly from the base element substantially parallel to the outer element to cooperatively form a battery casing channel therebetween. The spacing between adjacent battery cell engagement members form battery casing divider slots. A battery casing holder guide means comprising an adjustable pressure means including a pressure plate and handle are coupled to the rectangular frame.

In operation the battery casing and battery cells are placed in the upright position within the battery casing holder. The divider walls of the battery casing fit into the battery casing divider slots while the upper portion of the cells engage the battery casing channel. The adjustable pressure means is then secured to the battery casing to retain the battery casing within the battery casing holder. The battery casing is then inverted and placed onto the soldering elements such that the connector straps fit within the annular cavities. The guides engage in the channels while lowered. The vertical separation between the battery casing holder and soldering block is controlled by the vertical adjustment means. The apparatus is then actuated by depression of a control button on the control panel which energizes a transformer to heating the carbon members through holding elements to solder the connectors together. After a predetermined period of time, the timer shuts off the transformer and the fluid control means is opened permitting water to flow into the holding blocks to cool the apparatus.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a front view of a battery cell soldering apparatus.

FIG. 2 is a side view of the battery cell soldering apparatus.

Similar reference characters refer to similar parts throughout the several views of the drawings.

DETAILED DESCRIPTION OF THE PREFERRED EMBODIMENT

Figure 5:
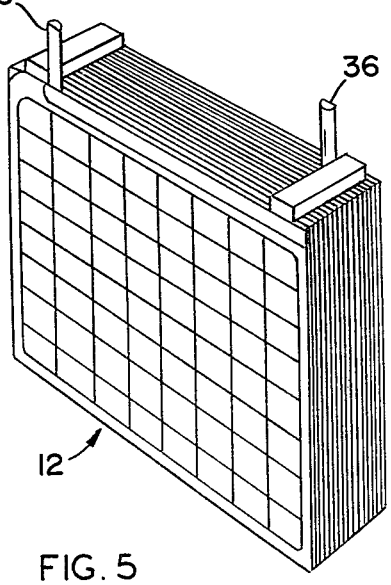
FIG. 5 is a perspective view of a battery cell.
Figure 6:
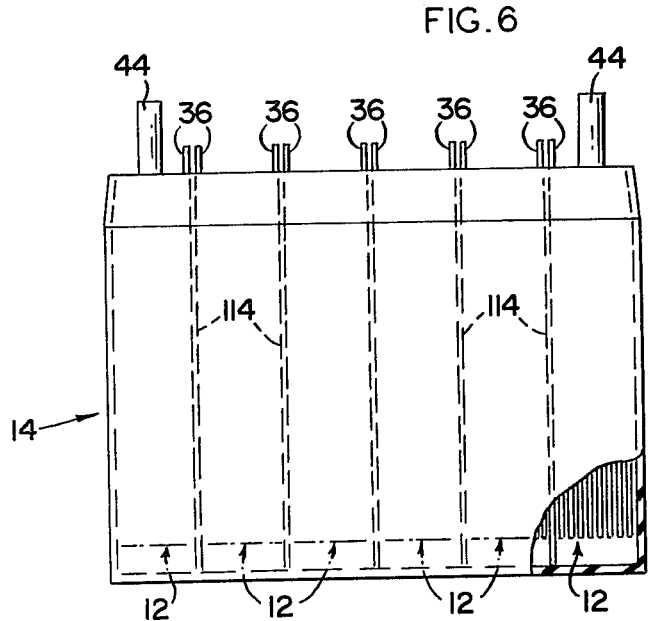
FIG. 6 is a side view of a battery casing.

As best shown in FIGS. 1 and 2, the present invention comprises a battery cell soldering apparatus generally indicated as 10 for coupling a plurality of battery cells 12 (FIG. 5) within a battery casing 14 (FIG. 6). The battery cell soldering apparatus 10 comprises a support platform generally indicated as 16 and a battery casing holder generally indicated as 18.

The support platform 16 comprises an upper and lower substantially horizontal platform element 20 and 22 respectfully held in fixed spaced relationship by a plurality of substantially vertical upright supports each indicated as 24. The upper substantially horizontal platform element 20 operatively supports a soldering block generally indicated as 26.

Figure 3:
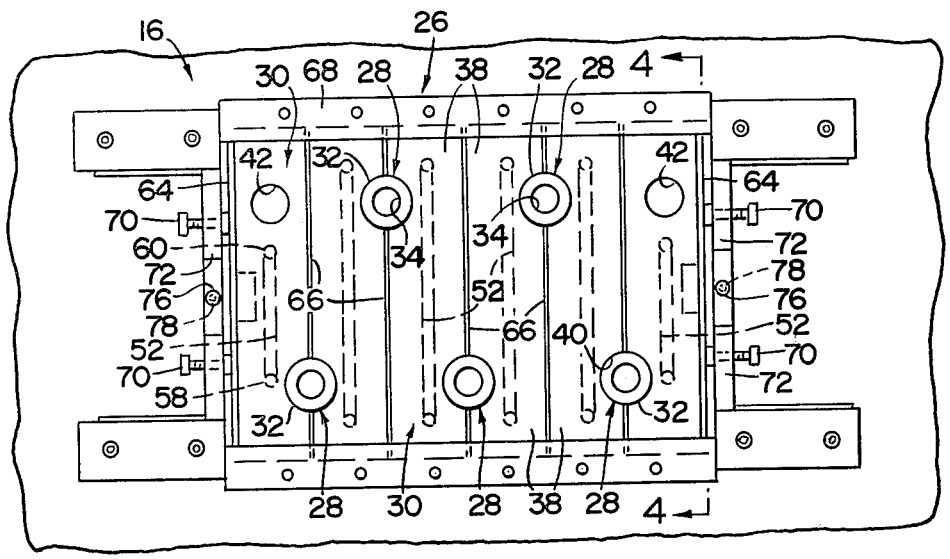
FIG. 3 is a top view of a soldering block.
Figure 4:
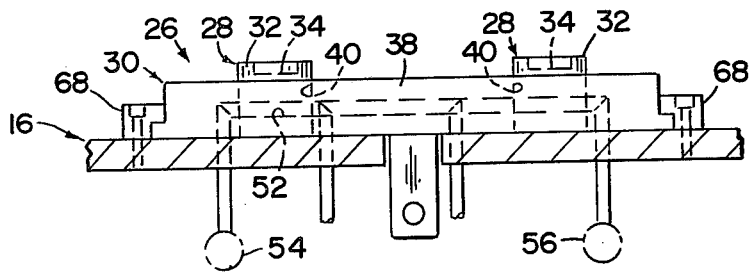
FIG. 4 is an end view of the soldering block.

As best shown in FIGS. 3 and 4, the soldering block 26 comprises a plurality of soldering elements 28 held in fixed spaced relation relative to each other by a plurality of holding elements 30. Each soldering element 28 comprises a substantially cylindrical carbon member 32 having a substantially annular cavity 34 formed on the upper portion thereof to receive the connection straps 36 (FIGS. 5 and 6) of the battery cells 12. Each holding element 30 comprises an electrically conductive, substantially flat rectangular plate 38 having concave cut out portions 40 formed thereon to receive the soldering elements 28.

In addition, each of the outer most holding elements 30 on opposite ends of the soldering block 26 includes a post receptacle 42 to operatively receive the battery terminals 44 (FIG. 6). The outer most holding elements 30 are coupled to an electrical source by cables 46 to transform 48 mounted on lower support platform element 22. Each holding element 30 is electrically coupled in series to the next adjacent holding element 30 by carbon members 32 which also serve as conductors.

The soldering block 26 further includes a cooling means to selectively cool the soldering block 26. As shown in FIGS. 1, 3 and 4, the cooling means comprises a plurality of cooling channels 52 formed within each holding element 30 coupled to an inlet and outlet manifold 54 and 56 respectively through inlet and outlet conduits 58 and 60 respectively. The inlet manifold 54, is in turn, coupled to a water or fluid source (not shown) through valve means 62 which comprises a portion of the control means more fully described hereinafter. The entire soldering block 26 is secured to the upper substantially horizontal platform 20 by an insulating frame comprising side frame elements 64 disposed on opposite sides of the soldering block 26, elongated strip insulator elements 66 disposed between adjacent holding elements 30 and end frame elements 68 disposed on opposite ends of the soldering block 26. The insulating frame further includes a horizontal adjustment means comprising a pair of horizontal adjustment elements 70 disposed at opposite ends of the soldering block 26. Each adjustment element 70 comprises a threaded member.

A vertical guide means is secured to the upper substantially horizontal platform 20. The vertical guides means comprises a pair of substantially vertical guides supports 72 disposed at opposite ends of the soldering block 26. Each of the substantially vertical guide 72 includes a central disposed guide channel 74 having a vertical adjustment means 76 formed on the lower portion thereof. The vertical adjustment means 76 comprises adjustable jack screws to control the vertical separation of the battery casing holder 18 relative to the soldering block 26 as more fully described hereinafter. The adjustment elements 70 extend through threaded aperatures 78 formed in the base of the substantially vertical guide supports 72.

The apparatus 10 further includes a control means comprising a control panel 80, timer 82 and fluid control means 62. The control panel 80 comprises control button 86 and timer control 88 coupled to circuitry to control operation of the transformer 48, timer 82 and fluid control means 62. The fluid control means 62 may comprise a solenoid valve or the like movable between a first or closed position and a second or open position.

Figure 7:
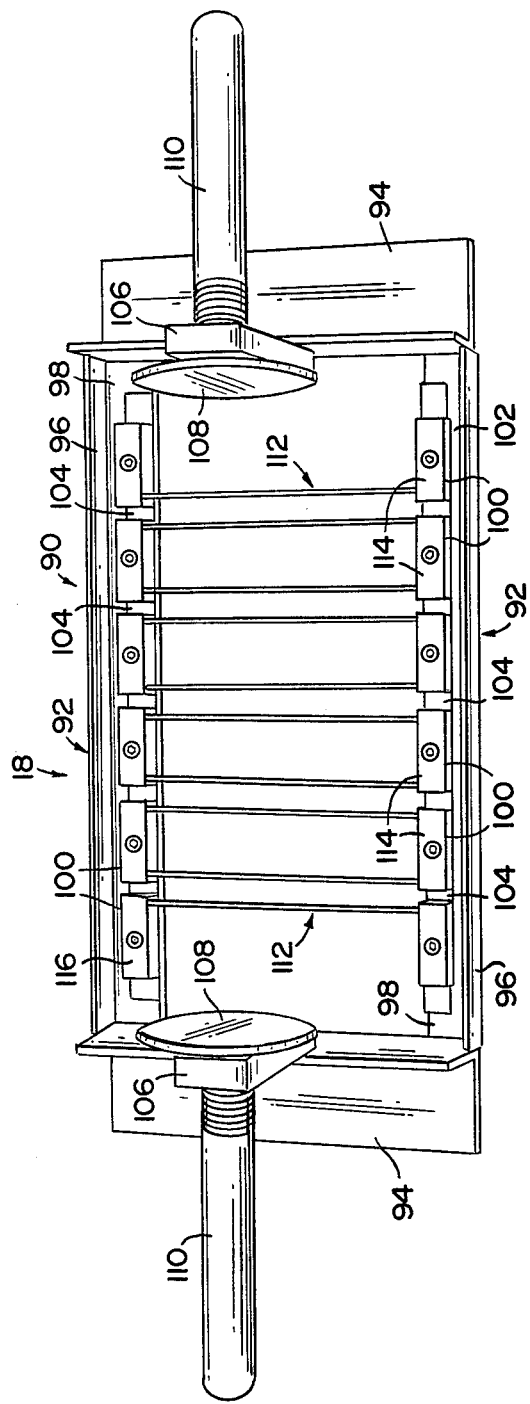
FIG. 7 is a perspective view of a battery casing holder.

As best shown in FIG. 7, the battery casing holder 18 comprises substantially rectangular frame 90 including side frame members 92 and end frame members 94. Each side frame member 92 comprises outer element 96 and base element 98 extending inwardly therefrom at a substantially right angle thereto. A plurality of spaced apart battery cell engagement members 100 extend upwardly from the base element 98 substantially parallel to the outer element 96 to cooperatively form a battery casing channel 102 therebetween. The spacing 104 between adjacent battery cell engagement members 100 forms battery casing divider slots. A battery casing holder guide means comprises a guide element 106 to slide into channels 74. An adjustable pressure means including pressure plate 108 and handle 110 are coupled to the substantially rectangular frame 90 by the guide element 106. A plurality of retainer means each generally indicated as 112 extend between the side frame members 92. Each retainer means 112 comprises a pair of substantially parallel spaced apart retainer elements to secure corresponding connector straps 36 in operative relation relative to each other during the process.

In operation the battery casing 14 and battery cells 12 are placed in the upright position within the battery casing holder 18. The divider walls 114 of the battery casing 14 fit into divider slots 104, while the upper portion of the cells engage the lower portion 116 of the battery engagement members 100. The adjustable pressure means are then secured to the sides of the battery casing 14 to retain the battery casing 14 within the battery casing holder 18. The battery casing 14 is then inverted and placed onto the soldering elements 28 such that the connector straps 36 fit within the substantially annular cavities 34. The guide elements 106 engage in the channels 74.

The apparatus 10 is then actuated by depression of the control button 86, which energizes the transformer 48 heating the cylindrical carbon members 32 through holding elements 30 to melt or liquify the connection straps 36. After a predetermined period of time, adjustable by timer control 88, the transformer 48 is shut off and the fluid control means 62 is opened permitting water to flow into the holding elements 30 through inlet manifold 54, inlet conduits 58, cooling channels 52, outlet conduits 60 and outlet manifold 56 to cool the soldering block 26 to solidify the bonded connection straps 36 together.

To vertically adjust the battery casing holder 18 relative to the soldering block 26 to provide for proper operative engagement between the connection straps 36 and annular cavities 34, the vertical adjustment means 76 (jack screws) are adjusted prior to use. In addition, the horizontal separation between adjacent holding elements 30 is controlled by the horizontal adjustment elements 70 to prevent arching therebetween.

It is important to note that since the battery casing 14 and battery cells 12 are inverted, the "solder" is not dripped into the casing 14.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A battery cell soldering apparatus for coupling a plurality of battery cells including connection straps within a battery casing comprising a support platform, said support platform comprises upper and lower substantially horizontal platform elements held in fixed space relation relative to each other by a plurality of substantially vertical upright supports and a battery casing holder wherein the support platform operatively supports a soldering block including a plurality of soldering elements coupled to an electric source together with a cooling means, said plurality of soldering elements are held in affixed space relation relative to each other by plurality of holding elements, said soldering block is secured to said upper substantially horizontal platform by insulating frame comprising side frame elements disposed on opposite sides of said soldering block, elongated strip insulator elements disposed between adjacent holding elements and end frame elements disposed at opposite ends of said soldering block, and control panel to selectively control the heating and cooling of said soldering block when the battery cells within the battery casing are held inverted in operative engagement with said plurality of soldering elements by said battery casing holder.

2. The battery cell soldering apparatus of claim 1 wherein each said soldering element comprises a substantially cylindrical carbon member having a substantially annular cavity formed on the upper portion thereof to receive the connection straps of the battery cells.

3. The battery cell soldering apparatus of claim 2 wherein each holding element comprises an electrically conductive, substantially flat rectangular plate having a concave portion formed therein to receive said plurality of soldering elements.

4. The battery cell soldering apparatus of claim 3 wherein the outermost of said holding elements on opposite ends of said soldering block each include a post receptacle formed thereon to operatively receive the battery terminals of the battery.

5. The battery cell soldering apparatus of claim 1 wherein said cooling means comprises a cooling channel formed in each said holding element coupled to an inlet and outlet manifold through an inlet and outlet conduit respectively wherein said inlet manifold is coupled to a fluid source.

6. The battery cell soldering apparatus of claim 1 wherein said insulating frame further includes horizontal adjustment means comprising a pair of adjustments elements disposed on opposite ends of said soldering block to prohibit arching.

7. The battery cell soldering apparatus of claim 1 further including a vertical guides means secured to said upper substantially horizontal platform to receive said battery casing holder.

8. The battery cell soldering apparatus of claim 7 wherein said vertical guide means comprises a pair of substantially vertical guide supports disposed at opposite ends of said soldering block, each said substantially vertical guides including a central disposed guide channel having a vertical adjustment means formed in the lower portion thereof to control the vertical separation of said battery casing holder relative to said soldering block.

9. The battery cell soldering apparatus of claim 1 wherein said control means comprises a control panel, timer and fluid control means.

10. The battery cell soldering apparatus of claim 1 wherein said battery casing holder comprises a substantially rectangular frame including end frame members and side frame members each said side frame member comprises an outer element and base element extending inwardly therefrom and a plurality of spaced apart battery cell engagement members extending upwardly from said base element substantially parallel to said outer element operatively formed a battery casing channel therebetween.

11. The battery cell soldering apparatus of claim 10 wherein the separation between adjacent battery cell engagement members cooperatively form battery casing divider slots.

12. The battery cell soldering apparatus of claim 11 wherein said battery casing holder guide means comprising a pair of guide elements formed on opposite ends of said battery casing holder to engage said channels.

13. The battery cell soldering apparatus of claim 10 wherein said battery casing holder further includes a plurality of retainer means, each said retainer means comprising a pair of spaced apart retainer elements to secure corresponding connector straps in operative relation relative to each other.

* * * * *